(12) United States Patent
Park et al.

(10) Patent No.: US 9,020,668 B2
(45) Date of Patent: Apr. 28, 2015

(54) APPARATUS AND METHOD FOR AIR CONDITIONING VEHICLE INTERIOR USING BATTERY CHARGE CONTROL OF ELECTRIC VEHICLE

(75) Inventors: June Kyu Park, Gyeonggi-do (KR); Hee Sang Park, Gyeonggi-do (KR); Hun Soo Kim, Gyeonggi-do (KR); Jung Hwan Yun, Seoul (KR); Hyun Kim, Gyeonggi-do (KR); Hee Jun Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 684 days.

(21) Appl. No.: 12/749,858

(22) Filed: Mar. 30, 2010

(65) Prior Publication Data

US 2011/0118919 A1 May 19, 2011

(30) Foreign Application Priority Data

Nov. 17, 2009 (KR) .................. 10-2009-0110683

(51) Int. Cl.
*B60L 9/00* (2006.01)
*B60H 1/00* (2006.01)
*B60L 1/00* (2006.01)
(Continued)

(52) U.S. Cl.
CPC ............ *B60H 1/00392* (2013.01); *B60L 1/003* (2013.01); *B60L 1/04* (2013.01); *B60L 11/1816* (2013.01); *B60L 11/184* (2013.01); *B60L 11/1844* (2013.01); *B60L 11/185* (2013.01); *B60L 11/1862* (2013.01); *B60L 11/1874* (2013.01); *B60L 11/1875* (2013.01); *B60L 2240/34* (2013.01); *B60L 2240/545* (2013.01); *B60L 2240/80* (2013.01); *B60L 2250/16* (2013.01); *B60L 2260/58* (2013.01); *Y02T 10/7088* (2013.01); *Y02T 10/7044* (2013.01); *Y02T 10/7005* (2013.01); *Y02T 10/705* (2013.01); *Y02T 90/169* (2013.01); *Y02T 90/121* (2013.01); *Y02T 90/14* (2013.01); *Y02T 90/128* (2013.01); *Y04S 10/126* (2013.01); *Y04S 30/14* (2013.01); *Y02E 60/721* (2013.01)

(58) Field of Classification Search
CPC ............................. B60H 1/00492; B60H 1/02
USPC ........................................ 701/22; 165/41–44
See application file for complete search history.

(56) References Cited

U.S. PATENT DOCUMENTS 5,725,048 A * 3/1998 Burk et al. ................ 165/42
7,621,262 B2 * 11/2009 Zubeck ..................... 123/543
2007/0243481 A1 10/2007 Klier et al.
(Continued)

FOREIGN PATENT DOCUMENTS

JP 07-303334 A 11/1995
JP 2008-092696 A 4/2008
(Continued)

*Primary Examiner* — John Q Nguyen
*Assistant Examiner* — Jordan S Fei
(74) *Attorney, Agent, or Firm* — Mintz Levin Cohn Ferris Glovsky and Popeo, P.C.; Peter F. Corless

(57) ABSTRACT

The present invention provides an apparatus and method for air conditioning a vehicle interior using a battery charge control of an electric vehicle, which can improve the cooling/heating performance by setting a start-up time of the electric vehicle and supplying heat generated from a battery during charge and its latent heat to the vehicle interior during initial start-up of the vehicle.

1 Claim, 4 Drawing Sheets

(51) Int. Cl.
*B60L 1/04* (2006.01)
*B60L 11/18* (2006.01)

(56) References Cited

U.S. PATENT DOCUMENTS

2008/0139102 A1* 6/2008 Major .......................... 454/139
2010/0206957 A1* 8/2010 Vyas et al. .................. 236/46 R
2010/0236846 A1* 9/2010 Kramer ..................... 180/65.21

FOREIGN PATENT DOCUMENTS

| KR | 10-0279433 | 11/2000 |
| KR | 10-0507458 | 2/2001 |
| KR | 10-0759706 | 11/2006 |
| KR | 10-0878969 | 6/2008 |

* cited by examiner

APPARATUS AND METHOD FOR AIR CONDITIONING VEHICLE INTERIOR USING BATTERY CHARGE CONTROL OF ELECTRIC VEHICLE

CROSS-REFERENCE TO RELATED APPLICATION

This application claims under 35 U.S.C. §119(a) the benefit of Korean Patent Application No. 10-2009-0110683 filed Nov. 17, 2009, the entire contents of which are incorporated herein by reference.

BACKGROUND (a) Technical Field

The present disclosure relates, generally, to an apparatus and method for air conditioning the interior of an electric vehicle. More particularly, it relates to an apparatus and method for air conditioning a vehicle interior using a battery charge control of an electric vehicle, which can suitably improve the cooling/heating performance by setting a start-up time of the electric vehicle and supplying heat generated from a battery during charge and its latent heat to the vehicle interior during initial start-up of the vehicle.

(b) Background Art

Pure electric vehicles driven only by an electric motor and hybrid vehicles driven by at least two power sources including an internal combustion engine and an electric motor are environment-friendly vehicles which provide an improvement in fuel efficiency and a reduction in exhaust gas.

A high voltage battery is mounted in these electric vehicles and hybrid vehicles as an energy source for driving the electric motor, a DC/DC converter, etc. and is self charged by regenerative braking during deceleration.

Recently, a plug-in hybrid vehicle which maximizes the electric power by the driving power of the vehicle has been developed. This plug-in hybrid vehicle is driven over a long distance only by the electric power of the battery and then is driven by the existing engine using gasoline fuel.

Preferably, in the case where the electric power of the battery mounted in the plug-in hybrid vehicle or the electric vehicle is exhausted, the vehicle can be suitably driven by charging the battery with a power source in the home for a predetermined time like charging a cellular phone.

As shown in FIG. 4, the charging process of the plug-in hybrid vehicle or the electric vehicle preferably includes a process of charging a battery with a power source in the home (e.g., midnight electricity) for a predetermined period of time by inserting a charging plug of the power source into low-speed and high-speed charging ports provided on one and the other sides of a vehicle body, and a process of maintaining the current state-of-charge of the battery when the battery is fully charged without additional charge.

Accordingly, the battery is fully charged before the vehicle is driven, and the vehicle is ready to be driven.

During the battery charge, heat is suitably generated from the battery, and thus separate cooling means and overheating protection means are suitably provided to prevent the battery from overheating. However, the heat around the battery is not easily dissipated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides an apparatus and method for suitably air conditioning a vehicle interior using a battery charge control of an electric vehicle, which can suitably improve the cooling/heating performance during initial start-up of the vehicle by setting a start-up time of the electric vehicle and charging a battery before the start-up in which the charging process is divided into first and second processes such that, during the second charging process, the fluid around the battery is suitably preheated or cooled by heat generated from the battery and then is fed into the vehicle interior.

In a preferred embodiment, the present invention provides an apparatus for air conditioning a vehicle interior using a battery charge control of an electric vehicle, the apparatus preferably comprising a blower that is suitably mounted at an inlet of a battery case in which a plurality of battery cells are suitably arranged; a heat exchanger that is suitably disposed around the battery to heat-exchange with heat generated from the battery; a controller for suitably controlling charging/discharging time of the battery, on/off of the blower, and on/off of the heat exchanger; and an input unit for suitably inputting the charging/discharging time of the battery and a start-up time of the vehicle.

In a preferred embodiment, the apparatus may further include temperature sensors for suitably detecting battery temperature and interior temperature to control the speed of the blower.

In another preferred embodiment, the apparatus may further include a thermoelectric device that is suitably provided in a fluid passage of the heat exchanger.

In another aspect, the present invention provides a method for air conditioning a vehicle interior using a battery charge control of an electric vehicle, the method preferably comprising dividing the charging time, during which a battery is fully charged before a start-up time of the vehicle, into first and second charging processes; suitably performing the first charging process of the battery and storing heat generated during the first charging process of the battery; performing the second charging process of the battery and storing heat generated during the second charging process of the battery; and suitably exchanging the heat stored during the first and second charging processes with a heat exchanger disposed around the battery during start-up of the vehicle and supplying the heat-exchanged air to cool or heat the vehicle interior.

In a preferred embodiment, cold outside air fed into a battery case may pass through the heat exchanger heat-exchanged with the heat stored during the first and second charging processes to be heated, and the heated air may be suitably supplied to heat the vehicle interior.

In another preferred embodiment, hot outside air fed into a battery case may pass through a heat-absorbing side of a thermoelectric device (e.g., Peltier device) of the heat exchanger absorbing the heat stored during the first and second charging processes to be suitably cooled, and the cooled air may be supplied to cool the vehicle interior.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The above features and advantages of the present invention will be apparent from or are set forth in more detail in the accompanying drawings, which are incorporated in and form a part of this specification, and the following Detailed Description, which together serve to explain by way of example the principles of the present invention

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
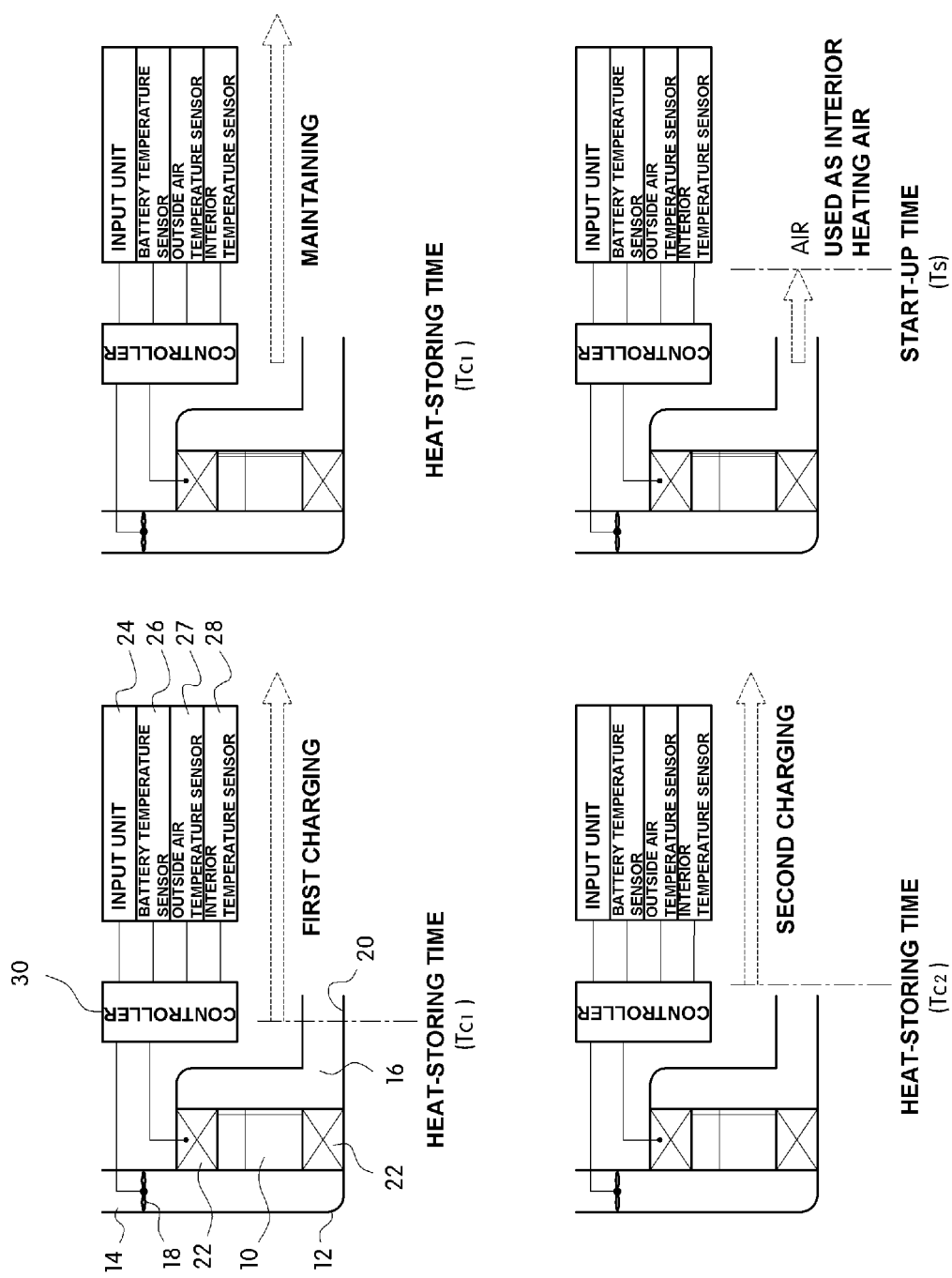
FIG. 1 is a schematic diagram illustrating an apparatus for air conditioning a vehicle interior using a battery charge control of an electric vehicle in accordance with an exemplary embodiment of the present invention.

Reference numerals set forth in the Drawings includes reference to the following elements as further discussed below:

| | |
|---|---|
| 10: battery | 12: battery case |
| 14: air inlet | 16: air outlet |
| 18: blower | 20: duct |
| 22: heat exchanger | 24: input unit |
| 26: battery temperature sensor | 27: outside air temperature sensor |
| 28: interior temperature sensor | 30: controller |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes an apparatus for air conditioning a vehicle interior using a battery charge control of an electric vehicle, the apparatus comprising a blower, a heat exchanger, a controller, and an input unit.

In one embodiment, the blower is mounted at an inlet of a battery case in which a plurality of battery cells are arranged.

In another embodiment, the heat exchanger is disposed around the battery to heat-exchange with heat generated from the battery.

In another embodiment, the controller is used for controlling charging/discharging time of the battery, on/off of the blower or on/off of the heat exchanger.

In one embodiment, the input unit is used for inputting the charging/discharging time of the battery and a start-up time of the vehicle.

In another aspect, the present invention features a method for air conditioning a vehicle interior using a battery charge control of an electric vehicle, the method comprising dividing the charging time, during which a battery is fully charged before a start-up time of the vehicle, into first and second charging processes, performing the first charging process of the battery and storing heat generated during the first charging process of the battery, performing the second charging process of the battery and storing heat generated during the second charging process of the battery, and exchanging the heat stored during the first and second charging processes with a heat exchanger disposed around the battery during start-up of the vehicle and supplying the heat-exchanged air to cool or heat the vehicle interior.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
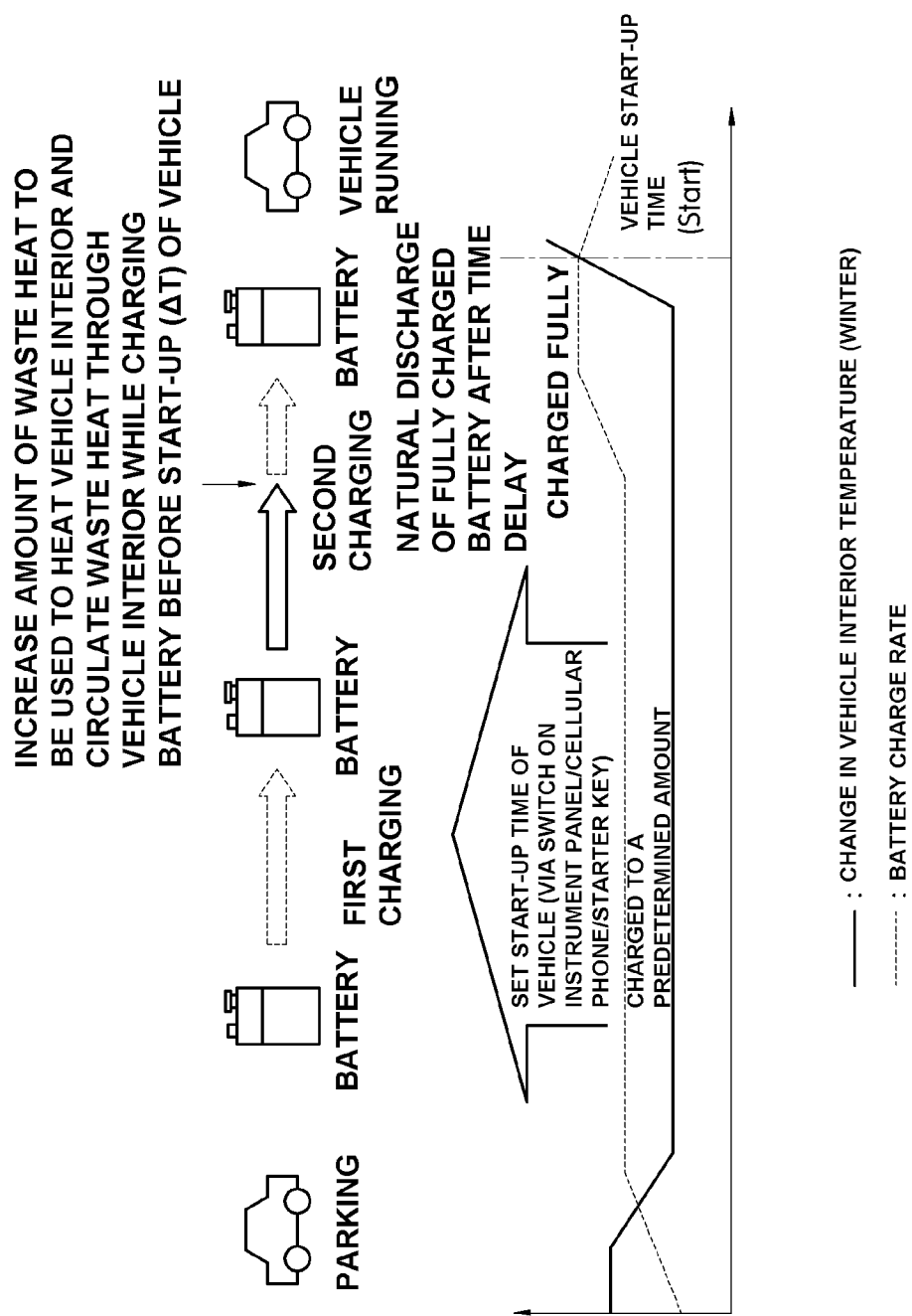
FIG. 2 is a schematic diagram illustrating a battery charging process of an electric vehicle in accordance with an exemplary embodiment of the present invention.

FIG. 1 is a schematic diagram illustrating an apparatus for air conditioning a vehicle interior using a battery charge control of an electric vehicle in accordance with an exemplary embodiment of the present invention. FIG. 2 is a schematic diagram illustrating a preferred battery charging process of an electric vehicle in accordance with an exemplary embodiment of the present invention.

Preferably, a battery module 10 comprising a plurality of cells is mounted in an electric vehicle or a hybrid vehicle to drive a running motor, and these battery cells are suitably arranged in a battery case 12.

In a further preferred embodiment, an air inlet 14 and an air outlet 16 are suitably provided on one and the other sides of the battery case 12, and a blower 18 is suitably mounted in the air inlet 14 for sucking the outside air.

According to preferred embodiments of the present invention, a reason that the outside air is fed into the battery case 12 by the operation of the blower 18 is to suitably cool the battery cells to an appropriate operating temperature (e.g., in a range of 25 to 40° C.) since the temperatures of the battery cells differ from each other and the charge and discharge performances also differ from each other according to the temperature of each cell due to the heat generated from the battery cells during charging/discharging of the battery 10.

According to the present invention, in order to use the amount of heat generated from each battery cell, the air outlet 16 of the battery case 12 is suitably connected to a duct 20 connected to the vehicle interior, and a heat exchanger 22 is suitably disposed around the battery 10, through which the outside passes, in the battery case 12.

In further preferred embodiments, the apparatus for air conditioning a vehicle interior using a battery charge control of an electric vehicle in accordance with an exemplary embodiment of the present invention preferably includes an input unit 24 for inputting a charging/discharging time of the battery 10 and an expected start-up time of the vehicle, temperature sensors 26, 27, and 28 for suitably detecting the temperature of the battery, the outside air temperature, and the interior temperature, respectively, and a controller 30 for suitably controlling the charging/discharging time of the battery 10, the on/off of the blower 18, and the on/off of the heat exchanger 22 in response to signals output from the input unit 24 and the temperature sensors 26, 27, and 28.

According to further preferred embodiments, a thermoelectric device (not shown) such as a Peltier device is further provided in a fluid passage of the heat exchanger 22 through which the outside air passes.

Preferably, the thermoelectric device has the Peltier effect in which when an electromotive force is suitably generated due to a discontinuous flow of energy between two metals, one metal is cooled (heat-absorbing side) by the electromotive force and the other metal generates heat (heat-dissipating side) corresponding to the amount of heat removed from the cooled metal. Thus, the thermoelectric device provided in the fluid passage of the heat exchanger 22 suitably performs a cooling operation to cool the outside air.

A method for air conditioning a vehicle interior using a battery charge control of an electric vehicle according to certain preferred embodiments of the present invention based on the above-described configuration is preferably described with reference to FIG. 3 below.

Preferably, after the electric vehicle is driven, an expected start-up time of the vehicle is set and the charging time of the battery, which is divided into first and second processes, is suitably input using the input unit 24 (e.g., a switch in the instrument panel, a wireless starter key, a mobile communication device, etc.).

Then, the first and second charging processes of the battery 10 are suitably performed to fully charge the battery 10 before the start-up time of the vehicle under the control of the controller 30. For example, the first charging process is suitably performed such that the state-of-charge of the battery 10 reaches a predetermined level, and the second charge process is suitably performed to fully charge the battery 10.

Preferably, the heat generated during the first charging process of the battery 10 is first stored in the battery case 12, and the heat generated during the second charging process of the battery 10 is secondly stored in the battery case 12, the heat being exchanged with the outside air fed into the battery case 12.

In further preferred embodiments, if it is determined that the temperature of the outside air fed into the battery case 12 is below 0° C. or below the temperature of the battery 10, for example like in winter, based on the detection results of the battery temperature sensor 26 and the outside air temperature sensor 27, the controller 30 suitably operates the heat exchanger 22 such that the heat stored during the first and second charging processes is suitably exchanged with the outside air in the heat exchanger 22. As a result, according to further preferred embodiments, the outside air passing through the heat exchanger 22 is suitably heated and the heated outside air is supplied to heat the vehicle interior.

Preferably, the vehicle interior is heated simultaneously with the initial start-up of the electric vehicle in winter, and thereby the initial heating performance of the electric vehicle can be suitably improved.

According to other further embodiments of the present invention, in summer, if it is suitably determined that the interior temperature is above a predetermined level (e.g., 30° C.) which requires cooling, the controller 30 preferably operates the heat exchanger 22 and applies current to the thermoelectric device provided in the fluid passage of the heat exchanger 22.

Preferably, the hot outside air fed into the battery case 12 passes through the heat-absorbing side metal (i.e., cooled metal) of the thermoelectric device (e.g., Peltier device) in the heat exchanger 22 absorbing the heat stored during the first and second charging processes to be cooled, and the cooled air is suitably supplied to cool the vehicle interior.

As described above, in certain preferred embodiments, the present invention provides the following effects.

According to preferred embodiments of the present invention, it is possible to suitably improve the cooling/heating performance during the initial start-up of the vehicle by setting the start-up time of the electric vehicle and charging the battery before the start-up in which the charging process is preferably divided into the first and second processes such that, during the second charging stage, the fluid around the battery is suitably preheated or cooled by heat generated from the battery and then is fed into the vehicle interior.

Preferably, since the charging process of the battery mounted in the electric vehicle or the hybrid vehicle is suitably divided into the first and second charging processes to fully charge the battery, it is possible to suitably increase the durability of the battery.

Figure 3:
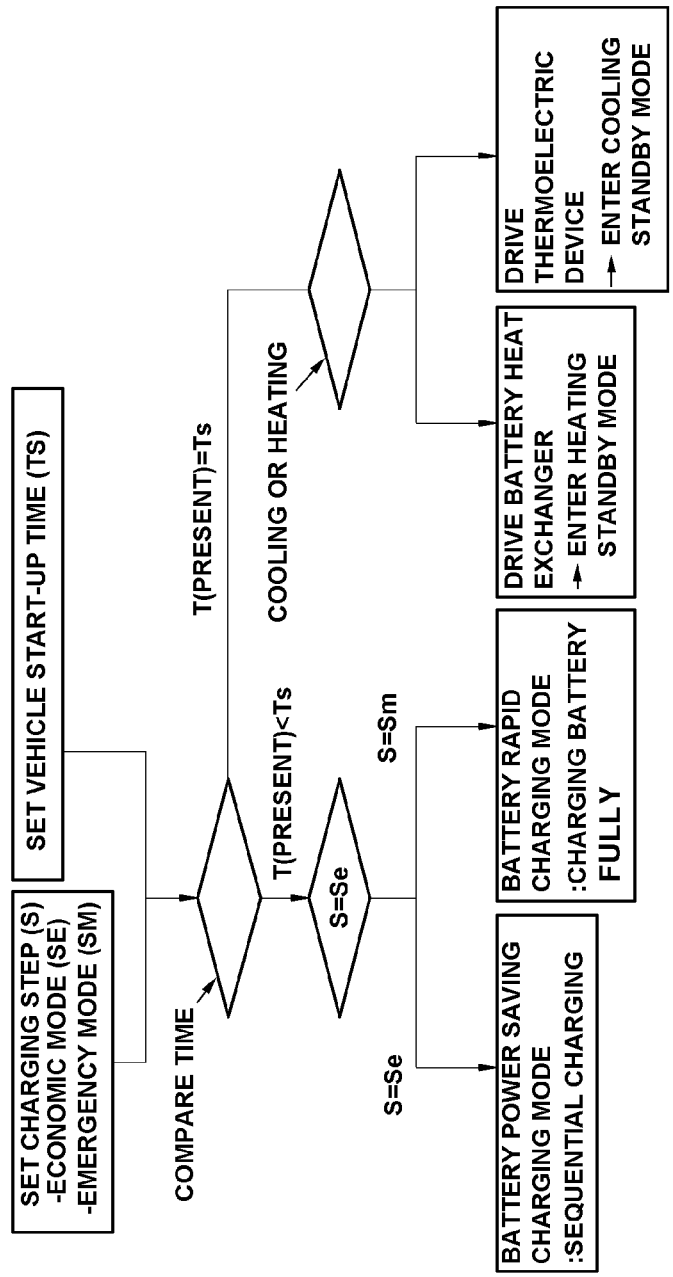
FIG. 3 is a flowchart illustrating a method for air conditioning a vehicle interior using a battery charge control of an electric vehicle in accordance with another exemplary embodiment of the present invention.
Figure 4:
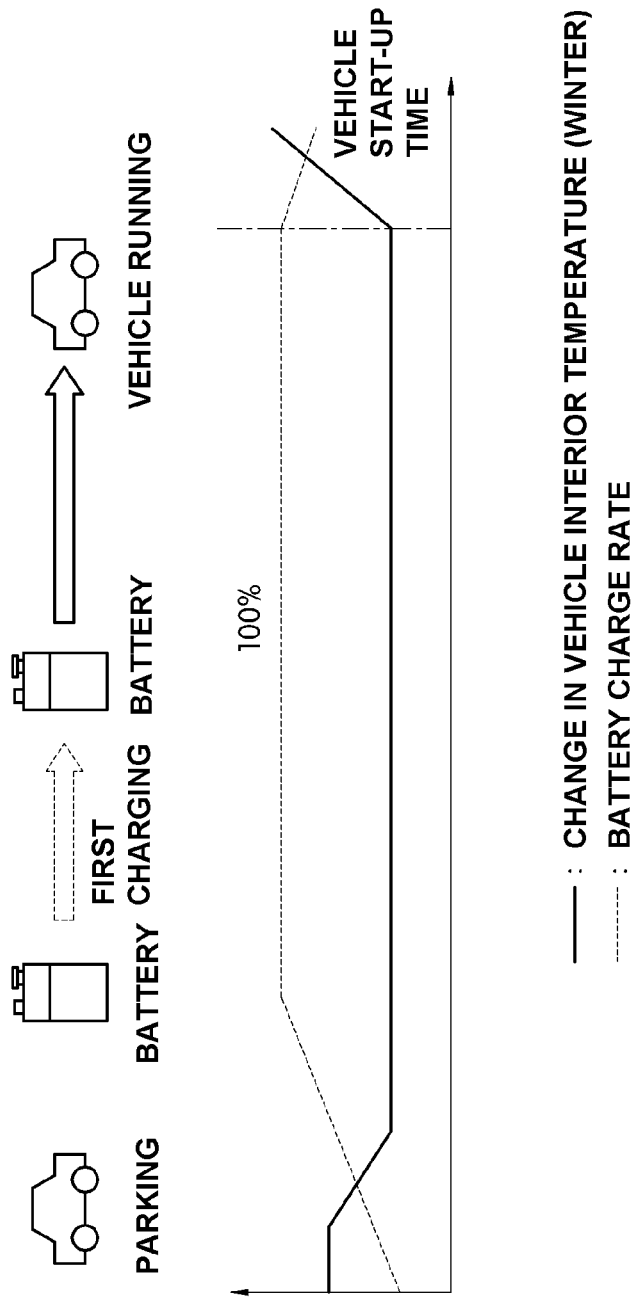
FIG. 4 is a schematic diagram illustrating a battery charging process of a conventional electric vehicle.

Preferably, since it is possible to suitably set the charging process without setting the running time of the vehicle to cool or heat the vehicle interior, it is possible to select the charging mode from an economic charging mode, in which the charging process is suitably performed in more than two stages before the start-up of the vehicle, and an emergency charging mode, in which the battery is rapidly charged if an immediate start-up is required, for example, as shown in the flowchart of FIG. 3

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for air conditioning a vehicle interior using a battery charge control of an electric vehicle, the method comprising:
   setting a start up time of the electric vehicle;
   dividing a charging time into first and second charging processes, wherein the charging time is a time until a battery is fully charged before the start-up time of the electric vehicle;
   performing the first charging process of the battery and storing in a battery case heat generated during the first charging process of the battery, wherein the first charging process is performed until the battery is charged to a predetermined level;
   performing the second charging process of the battery and storing in the battery case heat generated during the second charging process of the battery, wherein the second charging process is performed from the predetermined level until the battery is fully charged; and
   exchanging the heat stored in the battery case during the first and second charging processes with a heat exchanger disposed around the battery before the start-up time of the vehicle;

supplying the heat-exchanged air to the interior of the electric vehicle to cool or heat the electric vehicle interior, wherein when outside air below a first temperature is fed into the battery case from outside of the electric vehicle at the start up time of the electric vehicle and passes through the heat exchanger during the first and second charging process the outside air below the first temperature is heated by heat exchange with the heat stored in battery case and is then supplied to the electric vehicle interior, and wherein when outside air above a second temperature is fed into the battery case from outside of the electric vehicle at the start up time of the electric vehicle and passes through a heat-absorbing side of a thermoelectric device of the heat exchanger to absorb the heat stored in the battery case during the first and second charging processes, the outside air above the second temperature is cooled and supplied to the electric vehicle interior, wherein the second temperature is higher than the first temperature.

\* \* \* \* \*